United States Patent [19]
Bard et al.

[11] Patent Number: 5,614,706
[45] Date of Patent: Mar. 25, 1997

[54] BAR CODE SCANNING ASSEMBLY WITH CANTILEVERED OR TORSIONALLY VIBRATING FLEXURAL MEMBER

[75] Inventors: Simon Bard, Stony Brook; Askold Strat, Patchogue; Joseph Katz; Boris Metlitsky, both of Stony Brook, all of N.Y.

[73] Assignee: Symbol Technologies, Inc., Holtsville, N.Y.

[21] Appl. No.: 696,112

[22] Filed: Aug. 13, 1996

Related U.S. Application Data

[60] Continuation of Ser. No. 467,648, Jun. 6, 1995, abandoned, which is a division of Ser. No. 228,172, Apr. 15, 1994, Pat. No. 5,543,610, which is a continuation of Ser. No. 884,734, May 15, 1992, abandoned.

[51] Int. Cl.[6] ........................................ G06F 7/10
[52] U.S. Cl. .............................. 235/472; 235/467
[58] Field of Search ........................ 235/472, 467; 356/214

[56] References Cited

U.S. PATENT DOCUMENTS

| | | | |
|---|---|---|---|
| 3,532,408 | 10/1970 | Dostal | 359/214 |
| 3,978,318 | 8/1976 | Romeo et al. | |
| 4,187,452 | 2/1980 | Knappe et al. | 359/214 |
| 4,264,119 | 4/1981 | Minoura et al. | |
| 4,268,129 | 5/1981 | Araki | 359/214 |
| 4,364,000 | 12/1982 | Burke, Jr. | 359/214 |
| 4,421,381 | 12/1983 | Ueda et al. | 359/214 |
| 4,502,752 | 3/1985 | Montagu | 359/214 |
| 4,685,775 | 8/1987 | Goodman et al. | |
| 4,714,830 | 12/1987 | Usui | |
| 4,732,440 | 3/1988 | Gadhok | 359/214 |
| 4,766,299 | 8/1988 | Tierney et al. | |
| 4,902,083 | 2/1990 | Wells | |
| 4,919,500 | 4/1990 | Paulsen | |
| 5,118,149 | 6/1992 | Emmons | |
| 5,170,277 | 12/1992 | Bard et al. | |
| 5,177,631 | 1/1993 | Orlicki | 359/214 |
| 5,185,676 | 2/1993 | Nishiberi | |
| 5,191,197 | 3/1993 | Metlitsky et al. | |
| 5,198,651 | 3/1993 | Barkan et al. | 359/214 |
| 5,340,972 | 8/1994 | Sandor | |

FOREIGN PATENT DOCUMENTS

0373935A3  6/1990  European Pat. Off. .

*Primary Examiner*—Harold Pitts
*Attorney, Agent, or Firm*—Kirschstein, et al.

[57] ABSTRACT

An optical scanner module, for use in a bar code reader, has an electromagnetic coil across which is disposed a thin flexible strip. Mounted to the center of the strip is an optical element, such as a lightweight mirror, and a magnetic element, such as a permanent magnet. When an AC signal is applied to the electromagnetic coil, a varying magnetic field is produced which interacts with the fixed magnetic field of the magnet causing the magnet and mirror assembly to flex the flexible strip (e.g., in a twisting motion), thereby changing the spatial orientation of the mirror. By suitably driving the electromagnetic coil, the mirror can be made to oscillate, thereby converting a laser beam directed onto the mirror into a scanning laser beam. The entire module is compact, inexpensive to manufacture, and robust. Additional robustness may be provided by incorporating shock-absorber material between the flexible strip and the electromagnetic coil, and protecting the mirror by covering the front surface of the scanner module with a transparent shield.

20 Claims, 7 Drawing Sheets

BAR CODE SCANNING ASSEMBLY WITH CANTILEVERED OR TORSIONALLY VIBRATING FLEXURAL MEMBER

This application is a continuation of No. 08/467,648, filed Jun. 6, 1995, now abandoned which is a division of application Ser. No. 08/228,172 filed Apr. 15, 1994, now U.S. Pat. No. 5,543,610, which is a continuation of application Ser. No. 07/884,734, filed May 15, 1992, now abandoned.

BACKGROUND OF THE INVENTION

1. Field of the Invention

The present invention relates generally to a compact bar code scanning arrangement, and more particularly pertains to a compact bar code scanning arrangement which is simple, capable of producing several different types of scanning patterns, and does not utilize a relatively bulky motor-driven construction. In a preferred embodiment, the compact bar code scanner is used in a small housing mounted on an index finger of an operator such that the natural pointing direction of the index finger aims the scanner.

In general, it would be desirable to provide a compact bar code scanner which eliminates the need for bulky motor-driven constructions and is capable of achieving a high speed 250–300 Hz scan motion.

The present invention provides a compact bar code scanner which is capable of scanning in any one of several modes, a linear scan mode which scans along a single axis, an omnidirectional scan mode which scans with consecutive scan lines which are angularly displaced relative to each other, such as a Lissajous scan pattern, or a raster scan mode which scans with consecutive scan lines along a first scan axis, and the consecutive scan lines are displaced relative to each other along a second perpendicular axis. With a Lissajous scan pattern, scans are performed according to the combination of two x and y sinusoidal drive signals. In the special case wherein the frequency of the x drive signal $f_x=f_y$, the frequency of the y drive signal, the Lissajous scan is a circular scan pattern, and when $f_x \neq f_y$, many different complex scan patterns can be generated depending upon the relationship of $f_x$ to $f_y$.

2. Discussion of the Prior Art

Various optical readers and optical scanning systems have been developed heretofore for reading bar code symbols appearing on a label or on the surface of an article. The bar code symbol itself is a coded pattern of indicia comprised of a series of bars of various widths spaced apart from one another to bound spaces of various widths, with the bars and spaces having different light-reflecting characteristics.

The scanning of bar code patterns has become more complex as bar code patterns have become both more complex and more compact. A typical bar code pattern includes lines and spaces of different widths extending in an x direction, and can be scanned by one or more linear scans in the x direction. Moreover, because the direction of the scan is not always precisely aligned with the direction of the bar code pattern, more complex omnidirectional scanning patterns are sometimes used, wherein consecutive scan lines are angularly displaced relative to one another to form a complex omnidirectional scanning pattern. Two dimensional (2D) bar code patterns (Code 49) have also been introduced wherein, in addition to a typical bar code pattern having lines and spaces of varying widths along an x direction, typical bar code patterns are stacked one upon the other in the y direction to form the 2D bar code pattern. Accordingly, scanning of a 2D bar code pattern is more complex, and requires a raster type of scan wherein consecutive x direction scans are displaced in the y direction by the spacing between stacked rows of the 2D bar code pattern to form a raster scan.

The readers and scanning systems electrooptically transform the graphic indicia into electrical signals, which are decoded into alphanumerical characters that are intended to be descriptive of the article or some characteristic thereof. Such characters are typically represented in digital form and utilized as an input to a data processing system for applications in point-of-sale processing, inventory control, and the like. Scanning systems of this general type have been disclosed, for example, in U.S. Pat. Nos. 4,251,798; 4,369,361; 4,387,297; 4,409,470; 4,760,248; and 4,896,026, all of which have been commonly assigned to the same assignee as the present application.

As disclosed in some of the above patents, one embodiment of such a scanning system resides, inter alia, in a portable laser scanner which is grasped and hand-held by a user, which is designed to allow the user to aim the scanner, and more particularly a light beam emanating therefrom, at a target bar code symbol to be read.

In prior art bar code scanners, the light source in a laser scanner is typically a gas laser or semiconductor laser. The use of a semiconductor device such as a laser diode as the light source in scanning systems is especially desirable because of their small size, low cost and low power requirements. The laser beam is optically modified, typically by a lens, to form a beam spot of a certain size at the target distance. It is preferred that the beam spot size at the target distance be approximately the same as the minimum width between regions of different light reflectivity, i.e., the bars and spaces of the symbol.

Bar code symbols are formed from bars or elements that are typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spacers. The number of characters per inch represented by the bar code symbol is referred to as the density of the symbol. To encode a desired sequence of characters, a collection of element arrangements are concatenated together to form the complete bar code symbol, with each character of the message being represented by its own corresponding group of elements. In some symbologies a unique "start" and "stop" character is used to indicate where the bar code begins and ends. A number of different bar code symbologies exist. These symbologies include UPC/EAN, Code 39, Code 128, Codabar, and Interleaved 2 of 5.

For the purpose of this discussion, characters recognized and defined by a symbology shall be referred to as legitimate characters, while characters not recognized and defined by that symbology are referred to as illegitimate characters. Thus, an arrangement of elements not decodable by a given symbology corresponds to an illegitimate character(s) for that symbology.

In order to increase the amount of data that can be represented or stored on a given amount of surface area, several new bar code symbologies have recently been developed. One of these new code standards, Code 49, introduces a "two-dimensional" concept by stacking rows of characters vertically instead of extending the bars horizontally. That is, there are several rows of bar and space patterns, instead of only one row. The structure of Code 49 is described in U.S. Pat. No. 4,794,239, which is hereby incorporated by reference.

A one-dimensional single-line scan, as ordinarily provided by hand-held readers, has disadvantages in reading these two-dimensional bar codes; that is, the reader must be aimed at each row individually. Likewise, the multiple-scan-line readers produce a number of scan lines at an angle to one another so these are not suitable for recognizing a Code 49 type of two-dimensional symbols.

In the scanning systems known in the prior art, the light beam is directed by a lens or similar optical components along a light path toward a target that includes a bar code symbol on the surface. The scanning functions by repetitively scanning the light beam in a line or series of lines across the symbol. The scanning component may either sweep the beam spot across the symbol and trace a scan line across and past the symbol, or scan the field of view of the scanner, or both.

Scanning systems also include a sensor or photodetector which functions to detect light reflected from the symbol. The photodetector is therefore positioned in the scanner or in an optical path in which it has a field of view which extends across and slightly past the symbol. A portion of the reflected light which is reflected by the symbol is detected and converted into an electrical signal, and electronic circuitry or software decodes the electrical signal into a digital representation of the data represented by the symbol that has been scanned. For example, the analog electrical signal from the photodetector may typically be converted into a pulse width modulated digital signal, with the widths corresponding to the physical widths of the bars and spaces. Such a signal is then decoded according to the specific symbology into a binary representation of the data encoded in the symbol, and to the alphanumeric characters represented thereby.

The decoding process in known scanning systems usually works in the following manner. The decoder receives the pulse width modulated digital signal from the scanner, and an algorithm implemented in software attempts to decode the scan. If the start and stop characters and the characters between them in the scan are decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available.

Such a signal is then decoded according to the specific symbology into a binary representation of the data encoded in the symbol, and to the alphanumeric characters so represented.

Laser scanners are not the only type of optical instrument capable of reading bar code symbols. Another type of bar code reader incorporates detectors based upon charge coupled device (CCD) technology. In such readers, the size of the detector is larger than or substantially the same as the symbol to be read. The entire symbol is flooded with light from the reader, and each CCD cell is sequentially read out to determine the presence of a bar or a space. Such readers are lightweight and easy to use, but require substantially direct contact or placement of the reader on the symbol to enable the symbol to properly read. Such physical contact of the reader with the symbol is a preferred mode of operation for some applications, or as a matter of personal preference by the user.

SUMMARY OF THE INVENTION

Accordingly, it is a primary object of the present invention to provide a compact bar code scanning arrangement. In a preferred embodiment, the compact bar code scanner is used in a small housing mounted on an index finger of an operator such that the natural pointing direction of the index finger aims the scanner.

A further object of the subject invention is the provision of a compact bar code scanning arrangement which is simple, capable of producing several different types of scanning patterns, is capable of achieving high scanning rates, and does not utilize a relatively bulky motor-driven construction.

The present invention provides a compact bar code scanner which in different embodiments is capable of scanning in any one of several modes, a linear scan mode in which it scans along a single axis, an omnidirectional scan mode in which it scans with consecutive scan lines which are angularly displaced relative to each other in an omnidirectional scan pattern, such as a Lissajous scan pattern, or a raster scan mode in which it scans with consecutive scan lines along a first scan axis, and the consecutive scan lines are displaced relative to each other along a second perpendicular axis.

In accordance with several embodiments disclosed herein, the present invention provides a compact bar code scanner in which a flexural member is supported at one end in a cantilever fashion by a base, and mounts thereon a permanent magnet and a scanning mirror which has a scanning beam directed thereon, as from a visible laser diode. A drive coil is positioned adjacent to the permanent magnet, and during operation a periodically changing drive signal introduced into the coil induces a periodically changing magnetic field. The periodically changing magnetic field causes the flexural member, with the permanent magnet and scanning mirror mounted thereon, to oscillate at the frequency of the periodically changing drive signal, thereby causing a linear scanning of the scanning beam. For efficiency of operation, the resonant mechanical frequency of the flexural member with the scanning mirror and permanent magnet mounted thereon is designed to be at or near the frequency of the periodically changing drive signal.

In general, the embodiments disclosed herein are designed to operate at or near their resonant frequencies. However, the embodiments do not have to operate precisely at or near their resonant frequencies, and this is particularly true of the torsional mode embodiments.

In accordance with several embodiments disclosed herein, the permanent magnet is encircled by the drive coil, and the permanent magnet is mounted on the flexural member with an axis extending substantially centrally through its North and South poles also extending substantially perpendicular to the surface of said flexural member.

In accordance with a second embodiment disclosed herein, the bar code scanner as described hereinabove causes high frequency x scanning of the beam, which can be generated by any suitable source such as a visible laser diode, and the bar code scanner further includes a y scanning mechanism. The y scanning mechanism includes a separate y scanning mirror positioned to receive the high frequency x scanned beam. The y scanning mechanism includes a low frequency y flexural member supported at one end in a cantilever fashion by a base, and a high frequency y flexural member supported in cantilever fashion by the low frequency y flexural member. The y scanning mirror and a y drive permanent magnet are mounted on the high frequency y flexural member for movement therewith. A y drive coil is positioned by the y drive permanent magnet, and during operation a periodically changing y drive signal introduced into the y coil induces a periodically changing magnetic field. When a low frequency y drive signal is introduced into the y drive coil, the magnetic field generated thereby causes the low frequency y flexural member to oscillate at a low frequency to cause low frequency y scanning of the second y scanning mirror to generate a raster scanning pattern. When a high frequency y drive signal is introduced into the y coil, the high frequency y flexural member oscillates at a high frequency to cause high frequency y scanning of the second y scanning mirror to generate an omnidirectional scanning pattern. In this embodiment, each permanent magnet is encircled by each drive coil, and each permanent magnet is mounted on each flexural member with an axis extending substantially centrally through its North and South poles also extending substantially perpendicular to the surface of the flexural member on which the permanent magnet is mounted.

A mass is preferably mounted on the low frequency y flexural member to tune the resonant frequency thereof to be at or near the low frequency y drive signal for efficient operation.

In accordance with a third disclosed embodiment, a compact bar code scanner has a low frequency y flexural member supported at one end in a cantilever fashion by a base, and a permanent magnet is mounted thereon for movement therewith. A high frequency x flexural member is supported in cantilever fashion by the low frequency flexural member. A permanent magnet and a single scanning mirror are mounted on the high frequency x flexural member for movement therewith, and a scanning beam is directed onto the scanning mirror. An x drive coil is positioned by the permanent magnet mounted on the high frequency x flexural member, and during operation a high frequency periodically changing x drive signal introduced into the x drive coil causes the high frequency x flexural member to oscillate at the high frequency of the x drive signal, thereby causing a high frequency x scanning of the scanning beam. A y drive coil is positioned adjacent to the permanent magnet mounted on the low frequency y flexural member, and during operation a low frequency periodically changing y drive signal introduced into the y drive coil causes the low frequency y flexural member to oscillate at the low frequency of the y drive signal, thereby causing a low frequency y scanning of the scanning beam, thereby resulting in the generation of a raster scanning pattern.

In this embodiment also, a mass is preferably mounted on the low frequency y flexural member to tune the resonant frequency thereof to be at or near the low frequency y drive signal, and the high frequency flexural member is supported in cantilever fashion by the mass. The resonant mechanical frequency of the high frequency x flexural member with the scanning mirror and permanent magnet mounted thereon is also designed to be at or near the frequency of the periodically changing x drive signal. Each permanent magnet is encircled by each drive coil, and each permanent magnet is mounted on each flexural member with an axis extending substantially centrally through its North and South poles also extending substantially perpendicular to the surface of the flexural member on which the permanent magnet is mounted. In this embodiment, a flexural y damping member is secured to the low frequency y flexural member to damp higher frequency oscillations thereof.

Fourth, fifth and sixth embodiments of a compact bar code scanner include a flexural member supported at one end in a cantilever fashion by a base, with the flexural member being able to flex in both orthogonally oriented x and y directions. A single scanning mirror is mounted on the flexural member for movement therewith, and a scanning beam is directed thereon.

In the fourth embodiment, an x drive permanent magnet is mounted on the flexural member for movement therewith, and an x drive coil is positioned adjacent to the x drive permanent magnet. During operation, a periodically changing x drive signal introduced into the x drive coil causes the flexural member to oscillate at the frequency of the periodically changing x drive signal, thereby causing an x scanning of the scanning beam. A y drive permanent magnet is also mounted on the flexural member for movement therewith, and a y drive coil is positioned adjacent to the y drive permanent magnet. During operation, a periodically changing y drive signal introduced into the y drive coil causes the flexural member to oscillate at the frequency of the periodically changing y drive signal, thereby causing a y scanning of the scanning beam. Each of the x drive and y drive permanent magnets is positioned at one end of respectively the x and y drive coils, and each of the x drive and y drive permanent magnets is mounted on the flexural member with an axis extending substantially centrally through its North and South poles also extending substantially parallel to central axes of respectively the x and y drive coils. The flexural member is supported at one end in a cantilever fashion in a vibrational damping material on the base, to damp undesired frequencies thereof.

In the fifth embodiment, a single permanent magnet is mounted on the flexural member for movement therewith. A pair of x drive coils is positioned by the permanent magnet, and during operation a periodically changing x drive signal introduced into the pair of x drive coils causes the flexural member, with the permanent magnet and scanning mirror mounted thereon, to oscillate at the frequency of the periodically changing x drive signal, thereby causing an x scanning of the scanning beam. A pair of y drive coils is also positioned by the permanent magnet, oriented orthogonally with respect to the pair of x drive coils, and during operation a periodically changing y drive signal introduced into the pair of y drive coils causes the flexural member, with the permanent magnet and scanning mirror mounted thereon, to oscillate at the frequency of the periodically changing y drive signal, thereby causing a y scanning of the scanning beam. The permanent magnet is positioned at one end of the pairs of x and y drive coils, and the permanent magnet is mounted on the flexural member with an axis extending substantially centrally through its North and South poles also extending substantially parallel to the central axes of the pairs of x and y drive coils.

In the sixth embodiment, a drive coil is mounted on the flexural member. A pair of x drive permanent magnets is positioned by the drive coil, and a pair of y drive permanent magnets is also positioned by the drive coil, oriented orthogonally relative to the pair of x drive permanent magnets, and during operation a periodically changing drive signal introduced into the coil causes the flexural member, with the drive coil and scanning mirror mounted thereon, to oscillate in both x and y directions at the frequency of the periodically changing drive signal, thereby causing a scanning of the scanning beam. The drive coil is positioned at one end of the pairs of x drive and y drive permanent magnets with an axis extending substantially centrally therethrough also extending substantially parallel to the central axes of the pairs of x and y drive permanent magnets.

In accordance with seventh, eighth and ninth embodiments disclosed herein, a low frequency flexural member is supported in cantilever fashion by a base, and a high frequency flexural member is supported in cantilever fashion by the low frequency flexural member for movement therewith. A scanning mirror is mounted on the high frequency flexural member for movement therewith, and a scanning beam is directed thereon. A permanent magnet means, which might include either a single magnet or first and second magnets with the poles of the first and second magnets being oriented orthogonally with respect to each other, is mounted on the high frequency flexural member for movement therewith. An x drive coil is positioned by the permanent magnet means, and a periodically changing high frequency x drive signal introduced into the x drive coil causes the high frequency flexural member, with the permanent magnet means and scanning mirror mounted thereon, to torsionally oscillate at the frequency of the periodically changing x drive signal, thereby causing an x scanning of the scanning beam. A y drive coil is positioned by the permanent magnet means, and during operation a periodically changing y drive signal introduced into the y coil induces a periodically changing magnetic field. When a low frequency y drive signal is introduced into the y drive coil, the low frequency flexural member oscillates at a low frequency to cause low frequency y scanning of the scanning mirror. When a high frequency y drive signal is introduced into the y coil, the high frequency flexural member oscillates at a high frequency to cause high frequency y scanning of the mirror.

In the seventh and ninth embodiments disclosed herein, the permanent magnet means is mounted on the high frequency flexural member with an axis extending substantially centrally through North and South poles thereof also extending substantially parallel to the central axis of the y drive coil and substantially perpendicular to the central axis of the x drive coil.

In the seventh, eighth and ninth embodiments, the permanent magnet means is positioned at one end of the x drive coil, and is mounted on the high frequency flexural member with an axis extending substantially centrally through a North and South pole thereof also extending substantially perpendicular to the central axis of the x drive coil, for operation in a torsional twisting mode.

For efficiency of operation, the torsional resonant mechanical frequency of the high frequency flexural member with the scanning mirror and permanent magnet means mounted thereon is designed to be at or near the frequency of the periodically changing x drive signal. Moreover, the bending resonant mechanical frequency of the high frequency flexural member with the scanning mirror and permanent magnet means mounted thereon is designed to be at or near the frequency of the periodically changing high frequency y drive signal. Also, a mass is mounted on the low frequency flexural member to tune its resonant frequency to the low frequency y drive signal, and the mass also mounts the high flexural member in cantilever fashion.

In the seventh embodiment, the permanent magnet means is positioned in an air gap between the x and y drive coils, which are mounted with their central axes substantially colinear.

In the eighth disclosed embodiment, an x drive coil is mounted side by side with the y drive coil with the central axes thereof being parallel, and the permanent magnet means is mounted by one end of the x and y drive coils. The center of the permanent magnet means is positioned opposite the central axis of the x drive coil, which induces torsional twisting of the permanent magnet and high frequency flexural member and x scanning of the beam. A poled end of the permanent magnet means is positioned opposite the central axis of the y drive coil, which induces either low frequency y scanning by low frequency flexing of the low frequency flexural member, or high frequency y scanning by high frequency flexing of the high frequency flexural member.

In the eighth disclosed embodiment, the permanent magnet means is mounted on the high frequency flexural member with an axis extending substantially centrally through its North and South poles also extending substantially perpendicular to the central axes of the x and y drive coils.

In the ninth embodiment, a mass is mounted on the low frequency flexural member to tune the resonant frequency thereof, and the mass is mounted to the base by a low frequency flexural member which extends from opposite sides of the mass to the base, and torsionally flexes during low frequency y scanning operations.

The present invention also provides a bar code scanning system in which a first housing is adapted to be worn on a user's finger. The first housing includes a symbol detection means for generating a light beam directed toward a symbol to be read on a target and for receiving reflected light from the symbol to produce an electrical signal corresponding to the intensity of the reflected light, and also a switch for energizing the scanning beam. The housing is mounted on the finger in a position to project a scanning beam forwardly generally in the natural pointing direction of the finger. The electrical signal is transferred from the first housing to a second housing which includes a signal processor for processing the electrical signal to generate therefrom a digitized signal descriptive of the bar code symbol. The second housing is mounted on the user's wrist, and includes therein a decoder for translating the digitized signal into data represented by the bar code symbol.

In an alternative embodiment, the present invention provides a bar code scanning system in which a first housing is adapted to be mounted on a user's finger to project a scanning beam forwardly generally in the natural pointing direction of the finger. The first housing includes a symbol detection means for generating a light beam directed toward a symbol to be read on a target and for receiving reflected light from the symbol to produce an electrical signal corresponding to the intensity of the reflected light, and a switch for energizing the light beam. The first housing also includes therein a signal processor for processing the electrical signal to generate therefrom a digitized signal descriptive of the bar code symbol, which is transferred from the first housing. In greater detail, the digitized signal is transferred from the first housing to a second housing mounted on the user's wrist which includes therein a decoder for translating the digitized signal into data represented by the symbol.

BRIEF DESCRIPTION OF THE DRAWINGS

The foregoing objects and advantages of the present invention for a compact bar code scanning arrangement may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
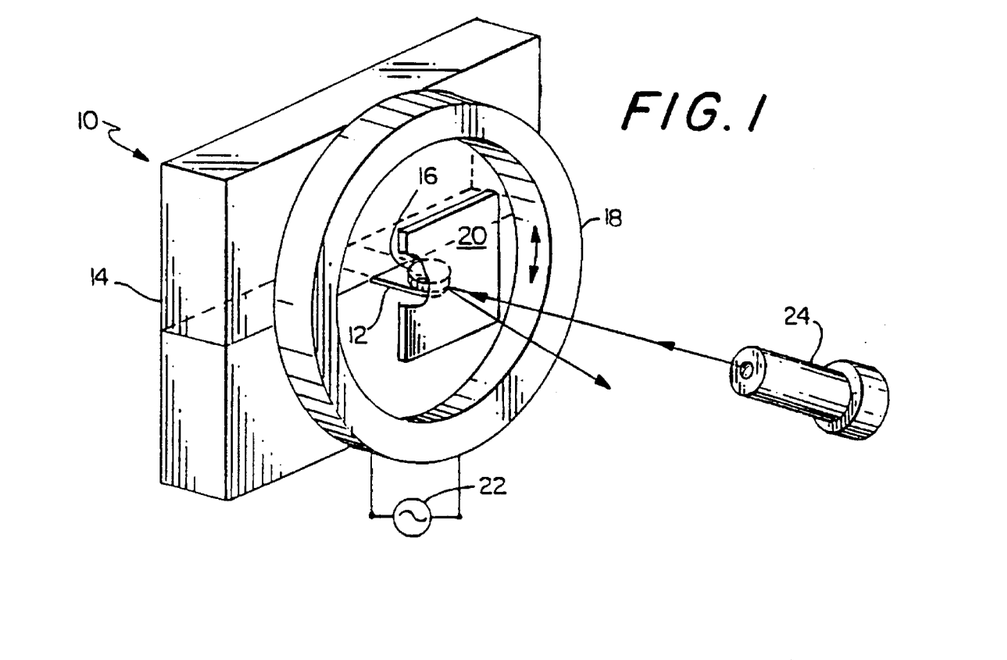
FIG. 1 is a perspective view of an exemplary embodiment of a simple and compact linear scanning arrangement pursuant to the teachings of the present invention which is driven without a traditional bulky motor.

FIG. 1 illustrates a first embodiment of the present invention for a simple and compact, high speed, linear bar code scanner which is driven without a traditional bulky motor. Referring to FIG. 1, a linear scanning arrangement 10 is provided in which a flexural strip 12 of a suitable flexible material such as Mylar is cantilever mounted to a base 14, as by being secured between two halves of the base 14. The flexural strip 12 supports thereon a miniature permanent magnet 16 positioned inside a coil 18, with an axis passing centrally through the North and South poles of the permanent intersecting the surface of the flexural strip 12 substantially perpendicular thereto. The coil 18 is also secured to the base 14, and a scan mirror 20 is attached to the free end of the cantilever mounted flexural strip 12. By changing the dimensions (length, width and thickness) or the flexural characteristics of the cantilever mounted strip 12, or the mass of the flexural strip 12, the permanent magnet 16 and mirror 20, or the distribution of mass on the flexural strip 12, different resonant frequencies can be established for the vibrating assembly. In general, the natural resonant frequency is determined by the size (length, width and thickness) and flexural strength of the cantilever mounted member, the distribution of mass, and the total mass of the vibrating assembly. Formulas are available and are known in the art to determine the resonant frequency of the vibrating assembly, which can also be tested and developed empirically. When a periodic drive signal 22, such as a sinusoidal signal, is introduced into the coil 18, the periodically reversing magnetic field induced thereby causes the cantilever mounted assembly to oscillate up and down, as shown in FIG. 1. This produces a linear scanning motion of the scan mirror 20, which causes a linear scanning of a beam directed onto the mirror by a suitable beam source such as a visible laser diode (VLD) 24. A sinusoidal periodic drive signal causes a periodically reversing magnetic field to be generated by the coil 18, thus creating moments of forces acting upon the North (N) and South (S) poles of the permanent magnet 18, to cause the magnet and the flexible strip 12 on which it is mounted, along with the scan mirror 20 (all of which comprise a cantilever mounted assembly) to vibrate up and down, perpendicular to the flat surface of the flexible strip 12, at a frequency dependent upon the frequency of the periodic drive signal.

In general, and for all of the embodiments disclosed herein, it is desirable to drive a cantilever mounted assembly or a torsional mode mounted assembly with a periodic signal at or near the resonant frequency of the assembly, and to design the assembly with a natural resonant frequency as high as possible to achieve high scan rates of up to several hundred hertz (e.g. 500 Hz). However, lower scan rates are also possible. In general, the chosen scan rate depends upon the particular application, and a 36 scans per second scan rate is typical, which is generated by a periodic signal of 18 Hz.

It is noted that in the description herein, the descriptions of further embodiments often build upon the descriptions of earlier embodiments, and accordingly the descriptions of the details, construction and mode of operation, to the extent they are identical or similar, is generally not repeated for the additional embodiments.

Figure 2:
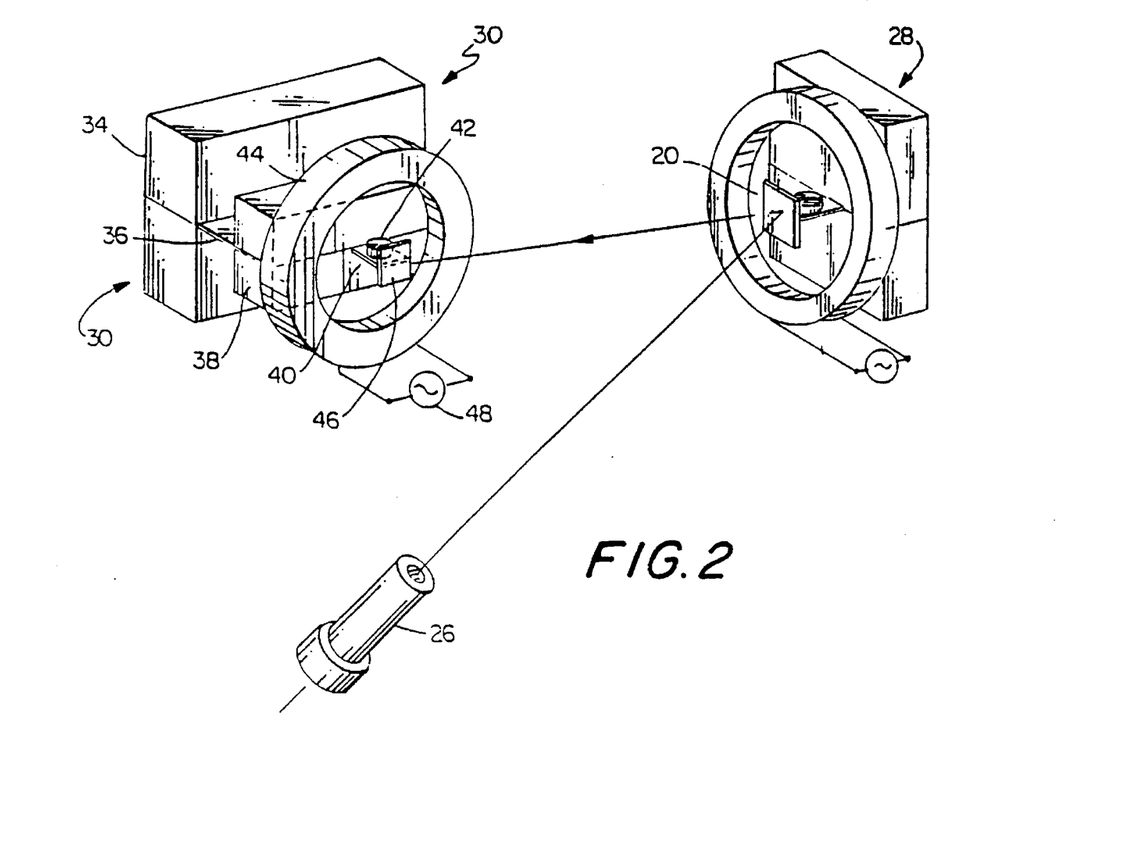
FIG. 2 illustrates a universal pattern scanning arrangement pursuant to the present invention which operates partially according to the principle of operation of the scanner of FIG. 1, and which is capable of scanning at a relatively high frequency in an x direction, and of either not being driven in y scanning to generate a linear x scanning pattern, or of scanning at two different frequencies in a y direction, a relatively high frequency for omnidirectional scanning patterns, or a relatively low frequency for raster scanning patterns.

FIG. 2 illustrates a universal pattern, compact bar code scanning arrangement which operates partially according to the principle of operation of the scanner of FIG. 1, and which is capable of scanning at a relatively high frequency in an x direction, and of not scanning in a y direction for production of a linear x scan, or of scanning at two different resonant frequencies in a y direction, a relatively high frequency or a relatively low frequency. A variety of bar codes and different bar code reading conditions require different types of scan patterns, such as linear scans, raster scan patterns, or omnidirectional scan patterns such as Lissajous type scan patterns. The embodiment of FIG. 2 is capable of producing all of these scan patterns with a relatively simple construction, and includes a double resonant construction for producing either a high or low frequency y vertical scan motion.

In the universal scanning arrangement of FIG. 2, a light beam from a suitable source such as a Visible Laser Diode (VLD) 26 is directed initially onto a high speed horizontal x deflection arrangement 28 which produces high speed x scanning deflections of the beam. The x deflection arrangement 28 can be and preferably is the same as the linear scanning arrangement 10 in FIG. 1. The resultant x scanned beam is then directed to a vertical deflection arrangement 30, which produces either no, or low or high speed vertical scanning deflections of the beam, provided respectively for raster and omnidirectional scan patterns. The y scanning arrangement 30 includes a flexible base provided with two degrees of mechanical freedom to provide two resonant conditions, a low frequency y scan for raster patterns, and a high frequency y scan for omnidirectional patterns. The y scanning arrangement is driven by the electromagnetic forces produced by a coil 44 which encircles a permanent magnet 42 mounted in the y scanning assembly 30 in a manner similar to that as explained with reference to the embodiment of FIG. 1.

The y scanning assembly 30 comprises a base 34 which supports a cantilever mounted low frequency flexural strip 36 which supports at its free end a mass 38, which in turn supports a smaller cantilever mounted high frequency flexural strip 40. The flexural strip 40 mounts thereon the permanent magnet 42 positioned within the coil 44, and a scanning mirror 46 mounted at the free end of the flexural strip 40. In this arrangement, the mass 38 and all of the structure mounted thereon (40, 42, 46) can oscillate on the cantilever mounted low frequency flexible strip 36 at a low resonant frequency $f_{rL}$, and the magnet 42 and scan mirror 46 can oscillate on the smaller cantilever mounted high frequency flexible strip 40 at a high resonant frequency $f_{rh}$. The mass 38 is selected to tune the resonant frequency of the low frequency y flexural member to be at or near the low frequency y drive signal for efficient operation. Similar to the first embodiment, for efficient operation the resonant mechanical frequency of the high frequency y flexural member with the y scanning mirror and permanent magnet mounted thereon is designed to be at or near the frequency of the periodically changing high frequency y drive signal. The resonant frequency of each vibrating assembly is determined in general by the spring constant K of the vibrating member and the mass M and distribution of mass of the vibrating assembly. In the two degree of freedom embodiment of FIG. 2, each of the two vibrating assemblies has a different spring constant K ($K_1$ and $K_2$) and a different mass M ($M_1$ and $M_2$) and distribution of mass.

Selection of either the low resonant frequency $f_{rL}$ or the high resonant frequency $f_{rh}$ is accomplished by changing the frequency of the y periodic drive signal. 48 through the y driving coil 44. When there is no driving current through the y driving coil 44, a laser beam from the VLD 26 is incident on the mirror 20 of the scanning assembly 28 which produces a fast (about 300 Hz) x scan line, which is directed onto and reflected by the mirror 46 of the y scanning assembly 30 without any changes in the scan pattern, thereby producing a linear horizontal scan line. When a low frequency signal 48 is connected to the y driving coil 44, it produces a low frequency vertical motion about the low frequency flexible strip 36, thereby producing a raster pattern. When a high frequency signal 48 is connected to the y driving coil 40, it produces a high frequency vertical motion about the high frequency strip 40, thereby producing an omnidirectional scanning pattern. In the second embodiment, the scanning movement in the y direction can be designed to be a desired ratio to the scanning movement in the x direction in accordance with the desired omnidirectional scan pattern.

Figure 3:
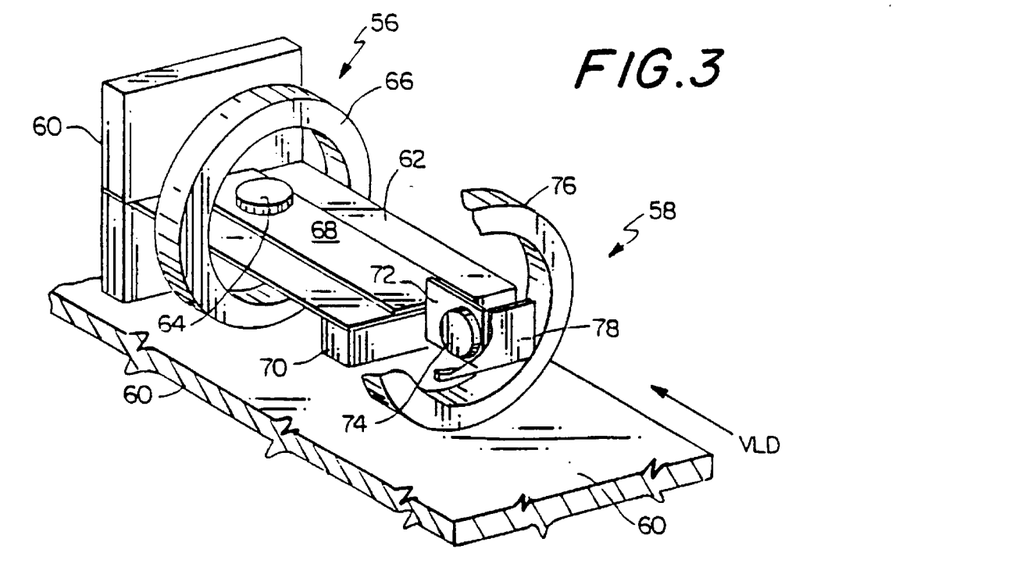
FIG. 3 illustrates a third embodiment of the present invention which is somewhat similar in operation to the embodiment of FIG. 2, but wherein y and x scanning mechanisms are mounted in a unitary assembly on a common base, and a single scan mirror performs both x and y scanning operations.

FIG. 3 illustrates a third embodiment of the present invention which is somewhat similar in operation to the embodiment of FIG. 2, but wherein y and x scanning mechanisms 56, 58 are mounted in a unitary assembly on a common base 60, which in a compact or miniaturized scanner can comprise a PC board. For perspective, in one designed embodiment the length of the base 60 was 1.1 inches, the height was 0.45 inches, and the width was 0.45 inches. The y scanning assembly 56 includes a flexural member 62, cantilever mounted to the base 60, which mounts a permanent magnet 64 positioned inside a y driving coil 66. The flexural member 62 can be fabricated of any suitable material such as Mylar, and includes thereon a damping flexural member 68 which can also be fabricated of any suitable material such as Mylar, which is included to damp higher frequency modes of oscillation of the y scanning assembly. A mass 70 is mounted at the free end of the cantilever flexural member 62 to tune the y scanning assembly to an appropriate low resonant frequency $f_{rL}$.

The x scanning assembly 58 includes a flexural member 72 cantilever mounted to the mass 70 at the free end of the y flexural member 72, and supports thereon a permanent magnet 74 positioned within an x driving coil 76. A single scan mirror 78 is mounted to the free end of the x flexural member 72, such that it is supported to be driven with high frequency x scanning movements and either no y scanning for a linear x scan or with a low frequency y scanning, to produce a raster type of scanning pattern. Each permanent magnet 64, 74 is encircled by each drive coil 66, 76, and each permanent magnet is mounted on each flexural member with an axis extending substantially centrally through its North and South poles also extending substantially perpendicular to the surface of the flexural member on which the permanent magnet is mounted. The feature of a single scan mirror is particularly advantageous as the small scan mirrors are expensive. The embodiment of FIG. 3 can produce a linear scan pattern by actuation of only the x scanning assembly 58, or a raster scan pattern by actuation of both the y and x drive assemblies 56 and 58, but cannot generate an omnidirectional scanning pattern.

Figure 4:
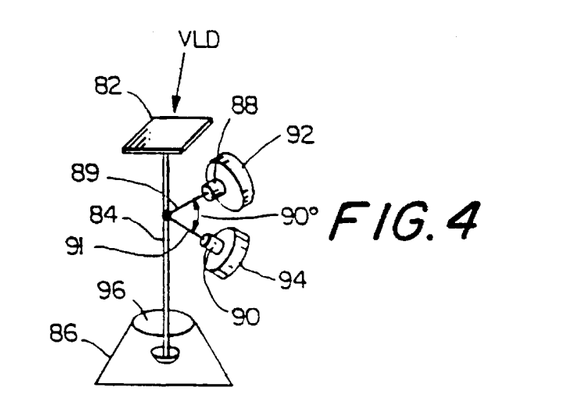
FIGS. 4, 5 and 6 illustrate three related embodiments of the present invention which are capable of producing virtually any different type of scanning pattern, including linear, omnidirectional such as Lissajous, or raster scanning patterns, and which utilize a single scanning mirror mounted at the free end of an electromagnetically driven central rod, which is capable of oscillating in two orthogonal x and y directions.
Figure 5:
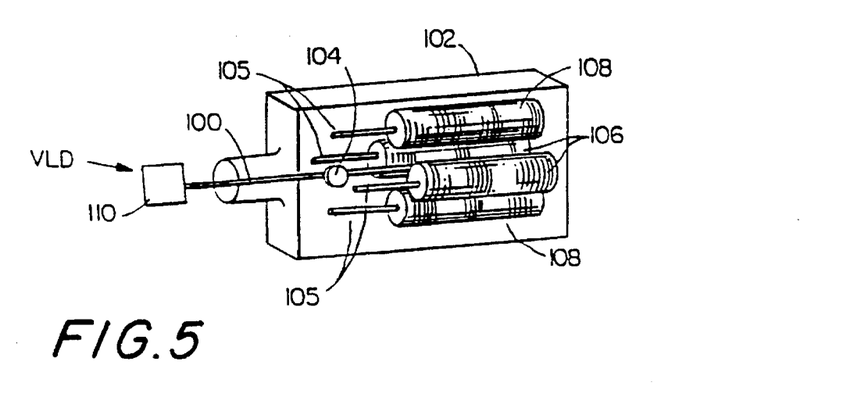
Figure 6:
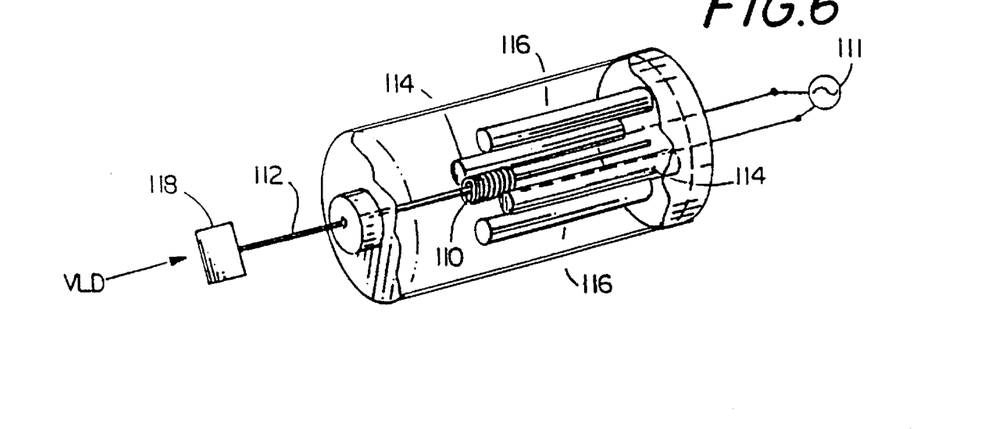

FIGS. 4, 5 and 6 illustrate three related embodiments of the present invention for a compact bar code scanner which include a flexural member supported at one end in a cantilever fashion by a base, with the flexural member being able to flex in both orthogonally oriented x and y directions. A single scanning mirror is mounted on the flexural member for movement therewith, and a scanning beam is directed thereon. These embodiments are capable of producing virtually any scanning pattern, including linear, omnidirectional such as Lissajous, or raster scan patterns, and which utilize a single scanning mirror.

In the embodiment of FIG. 4, a scan mirror 82 is mounted at the free end of a flexible shaft 84, the other end of which is flexibly fixed to a base 86 to provide a cantilever type mounting for the flexible shaft, which is capable of vibrating in both x and y directions. Two permanent magnets 88, 90 are mounted as by short mounting supports 89, 91 to the flexible shaft 84 and are mounted perpendicularly at 90° relative to each other. In this arrangement, axes extending centrally through both N and S poles of the permanent magnets 88 and 90 coincide respectively with the central axes of x and y driving coils 92, 94. In this arrangement, each of the coils 92, 94, when driven with a periodic drive signal, generates an alternately reversing magnetic field, as described hereinafter with reference to FIG. 10, with the alternately reversing magnetic field alternately attracting and repelling the pole of the permanent magnet positioned closest to the coil. A damping material 96 such as rubber, silicon, etc. is used to mount and hold the shaft 84 in place to the base 86 to create a restoring force and to damp oscillations thereof.

The embodiments of FIGS. 5 and 6 are similar, and their designs are based upon the designs of driving cartridges currently utilized to cut master records (e.g. 33 or 45 rpm recorded records). These driving cartridges are produced by manufacturers such as Shure Brothers, Inc. In the embodiment of FIG. 5, a central shaft 100 is supported in a small cartridge 102, and supports a small magnet 104 which is positioned centrally between projecting magnetic cores 105 of two pairs of x and y driving coils 106, 108, with the pair of x driving coils being oriented orthogonally with respect to the pair of y driving coils. A single scan mirror 110 is supported at the free end of the shaft 100, and is driven in x and y scanning movements by periodic drive signals applied to the x and y driving coils 106, 108.

The embodiment of FIG. 6 is functionally symmetrically opposite to the embodiment of FIG. 5, and includes a single moving coil 110, having an input 111, which is mounted on a shaft 112 which interacts magnetically with stationary pairs of opposed x and y permanent magnets 114, 116. A single scanning mirror 118 is mounted at the free end of the shaft 112, and is driven in x and y scanning movements by a periodic drive signal applied to the coil 110.

Figure 7:
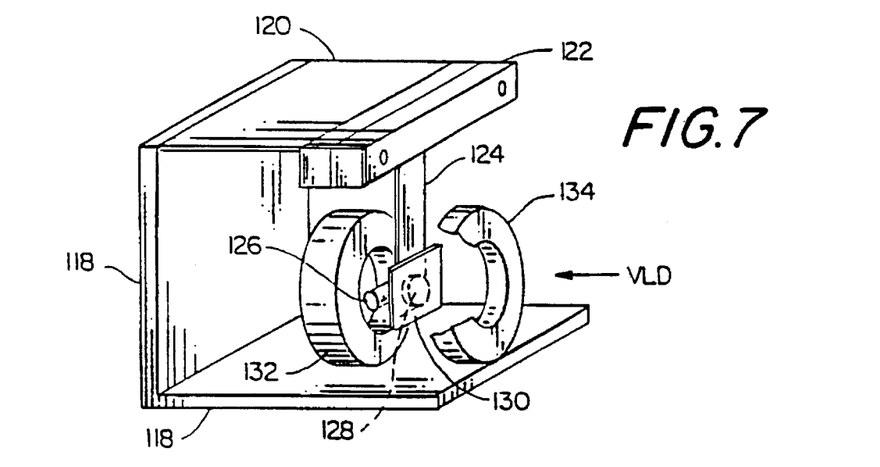
FIGS. 7 and 8 illustrate two related universal scanning embodiments of the present invention which include a base which mounts in cantilever fashion a low frequency y flexural member which mounts at its free end in cantilever fashion a high frequency flexural member, and wherein an x drive coil is driven with a constant high frequency drive signal to produce x scan deflections, and a second y drive coil uses a drive signal which is one of two fixed frequencies, a low frequency drive signal for raster scanning patterns, or a high frequency drive signal for omnidirectional scanning patterns.
Figure 8:
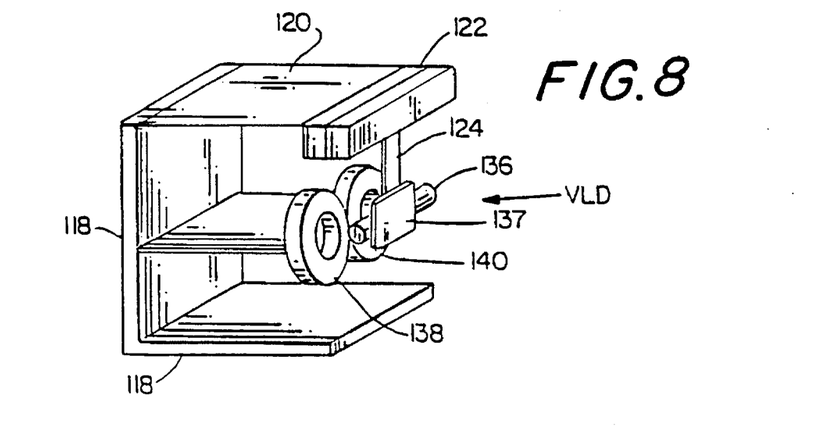

FIGS. 7 and 8 illustrate two related universal scanning embodiments of the present invention. The embodiment of FIG. 7 includes a base 118 which mounts in cantilever fashion a relatively wide, low frequency y flexural member 120 which mounts at its free end a mass 122. The mass 122 in turn mounts in cantilever fashion a relatively narrow, high frequency flexural member 124, which supports thereon two mutually perpendicular permanent magnets 126, 128 (can also be one T or cross shaped magnet) and a scan mirror 130 which is secured to the inner end (rightmost in FIG. 7) of the magnet 128. The permanent magnet 126 is positioned adjacent to an x drive coil 132, and the permanent magnet 128 is positioned adjacent to a y drive coil 134, with the assembly being positioned in the air gap between the two parallel coils 132, 134, which are driven by two periodic drive signals. The x drive coil 132 is driven with a constant high frequency drive signal to produce x scan direction deflections, and the second y drive coil 134 uses a drive signal which is one of two fixed frequencies, a low frequency drive signal for a raster scan pattern, or a high frequency drive signal for Lissajous scanning patterns.

Figure 10:
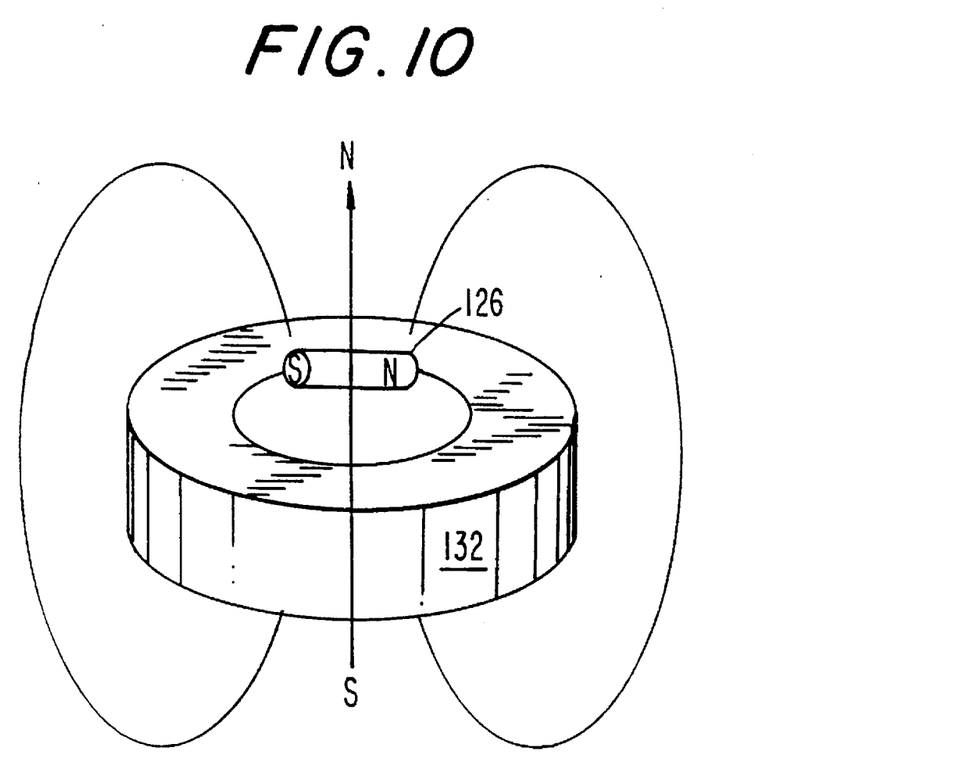
FIG. 10 illustrates the mode of operation of the x driving mechanism in the embodiments of FIGS. 7, 8 and 9, in which a permanent magnet interacts with an adjacent x driving coil.

FIG. 10 illustrates the mode of operation of the x driving mechanism in the embodiment of FIG. 7 in which permanent magnet 126 interacts with the x driving coil 132. When the coil 132 has a periodic drive signal applied thereto, the N and S poles thereof periodically reverse themselves. When the N pole is at the top and the S pole is at the bottom of FIG. 10, as illustrated in FIG. 10, the permanent magnet 126 and the flexural member 124 to which it is secured are torsionally twisted such that the S end of the permanent magnet is twisted towards the N pole at top, and the N end of the permanent magnet is twisted towards the S pole at the bottom. When the poles of the driving coil are reversed and the S pole is at the top and the N pole is at the bottom of FIG. 10, the permanent magnet 126 and the flexural member 124 are twisted in an opposite direction such that the N end of the permanent magnet 126 is twisted towards the S pole at the top, and the S end of the permanent magnet 126 is twisted towards the N pole at the bottom. Accordingly, the permanent magnet 126 and the flexural member 124 to which it is attached, and the scanning mirror 130, are alternately twisted and oscillated in clockwise and counterclockwise x scanning movements.

The y scanning mechanism in the embodiment of FIG. 7 operates in a manner similar to the embodiment of FIG. 4. The permanent magnet 128 is positioned with an axis extending centrally through the N and S ends of the permanent magnet being positioned colinear with the central axis of the y drive coil 134. One end of the permanent magnet 128 is positioned closest to the drive coil, such that as a periodic drive signal reverses the poles of the coil 134, the end of the magnet 128 closest to coil 134 is periodically attracted to and repelled by the reversing poles of the coil 134, thereby causing either the low frequency flexural strip 120 or the high frequency flexural strip 124 to bend periodically to produce either a high frequency scan with a high frequency drive signal or a low frequency scan with a low frequency drive signal.

For efficiency of operation, the torsional resonant mechanical frequency of the high frequency flexural member 124 with the scanning mirror 130 and permanent magnets 126, 128 mounted thereon is designed to be at or near the frequency of the periodically changing x drive signal. Moreover, the bending resonant mechanical frequency of the high frequency flexural member 124 with the scanning mirror 130 and permanent magnets 126, 128 mounted thereon is designed to be at or near the frequency of the periodically changing high frequency y drive signal. Also, the mass 122 is selected to tune the resonant frequency to the low frequency y drive signal.

In the seventh embodiment, the permanent magnets 126, 128 are positioned in an air gap between the x and y drive coils 132, 134, which are mounted with their central axes substantially colinear.

The embodiment of FIG. 8 includes a base 118, a low frequency y drive flexural member 120, mass 122, and a high frequency x drive flexural member 124, similar to the embodiment of FIG. 7. The drive arrangement includes a single horizontally positioned permanent magnet 136, with a scan mirror 137 mounted thereon, which is positioned adjacent to and is controlled and driven in scanning movements by two adjacent x and y drive coils 140, 138 which are wound on a soft metal core. The x drive coil 140 is positioned opposite the center of the permanent magnet and controls the horizontal x scanning motion, with the operation thereof being similar to the operation of the embodiment of FIG. 7 (x scan). The y drive coil 138 is positioned parallel to and side by side with the first coil opposite to one poled end of the permanent magnet and controls the y vertical scanning motion. As the polarity of the y drive coil is periodically reversed, the poled end of the permanent magnet in front of coil 138 is periodically attracted to and repelled by the alternating polarity of the x drive coil 138 which produces either low frequency y scanning by low frequency flexing of the low frequency flexural member 120, or high frequency y scanning by high frequency flexing of the high frequency flexural member 124.

Figure 9:
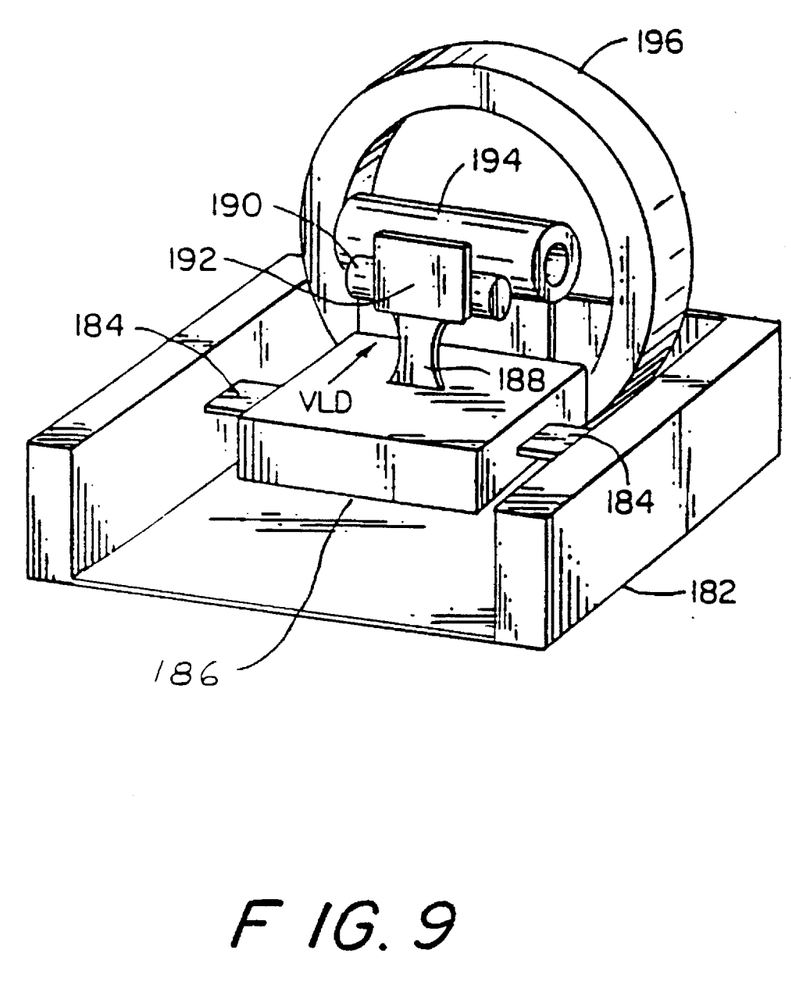
FIG. 9 illustrates a preferred embodiment of a universal compact bar code scanning arrangement pursuant to the present invention in which a base includes a low frequency y flexural mounting for a mass which provides a low frequency y scanning motion, and a second flexural member is cantilever mounted on the mass and mounts at its surface a scanning mirror and a permanent magnet which interacts with an adjacent encircling x driving coil to produce high frequency x scanning movements and with an adjacent y driving coil to produce either no, or high or low frequency y scanning movements.

FIG. 9 illustrates a preferred embodiment (best mode) of a compact bar code scanning arrangement pursuant to the present invention in which a mass 186 is mounted to a flexural mount 184, with each end thereof extending from an opposite side of the mass 186, which is periodically torsionally flexed back and forth to provide a slow vertical y scanning motion. In a preferred embodiment, a single flexural member 184 extends between two base mounts 182, with the mass 186 being secured to the single flexural member, as on the top thereof. Moreover, the single flexural member could be a suitable torsional rod attached directly to the base mounts 182, or attached indirectly to the base mounts 182 by suitable torsional springs. A second flexural member 188 is cantilever mounted on the mass 186, and mounts at its surface a permanent magnet 190 and a scanning mirror 192. The permanent magnet 190 interacts with an adjacent y driving coil 194 and an adjacent encircling x driving coil 196, with the magnet 190 interacting with the coils 194 and 196 in a manner as illustrated respectively in FIGS. 11 and 10.

Figure 11:
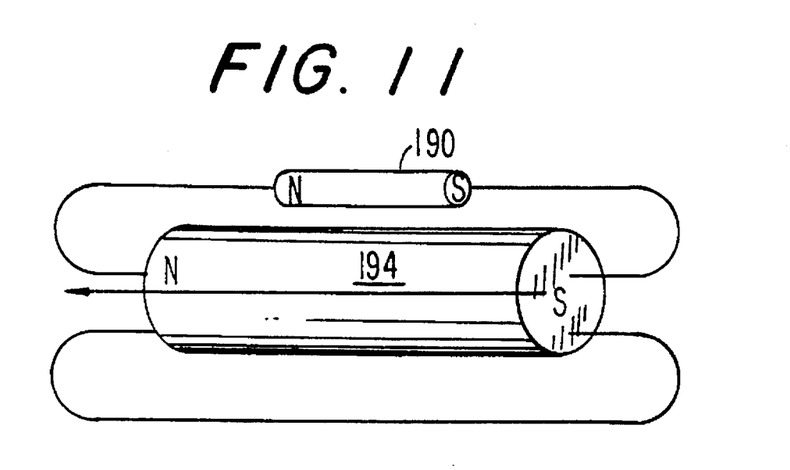
FIG. 11 illustrates the orientation of the permanent magnet of the embodiment of FIG. 9 relative to the y driving coil, and illustrates the manner in which the permanent magnet interacts with the y driving coil.

FIG. 11 illustrates the orientation of the permanent magnet 190 relative to the y driving coil 194, and illustrates the manner in which permanent magnet 190 interacts with the y driving coil 194. As a periodic drive signal is applied to drive coil 194, the poles of driving coil 194 periodically change from N to S. When the y drive coil 194 has its N pole at the left end and its S pole at the right end, as illustrated in FIG. 11, the magnet 190 is repelled thereby and is displaced away from the coil 194, and when the poles of the coil 194 are reversed, with the S pole at the left end and the N pole at the right end, the magnet 190 is attracted thereby and is displaced towards the coil 194, thus resulting in the magnet 190 being periodically oscillated away and towards the coil y drive 194 to produce a y scanning movement. When a low frequency y drive signal is utilized, the low frequency y drive flexural members 184 support a low frequency y drive oscillation of mirror 192, and when a high frequency y drive signal is utilized, the high frequency flexural member 188 supports a high frequency y drive oscillation.

The high frequency x drive coil 196 produces alternating reversals of the poles of the coil 196, and operates in a manner similar to the embodiment of FIG. 7 (x drive). When an N pole is present at the end of coil 196 adjacent to the permanent magnet 190, the S end of the permanent magnet is attracted thereto and the N end of the permanent magnet is repelled thereby, thus producing a periodic clockwise and counterclockwise torsional flexing of the flexural member 188, to produce a high frequency x scanning of the flexural member 188 and the mirror 192 mounted thereon.

In summary, two coils 194, 196, with mutually perpendicular axes, are located adjacent the magnet/mirror assembly, with coil 194 positioned in coil 196, and provide magnetic force which causes the entire assembly to oscillate in three modes, including a high frequency horizontal oscillation mode, either alone, or in a high frequency vertical oscillation mode or in a low frequency vertical oscillation mode.

In the ninth embodiment, the mass 186 tunes the torsional resonant frequency of the low frequency flexural member 184 which extends from opposite sides of the mass to the base, and torsionally flexes during low frequency y scanning operations.

Figure 12:
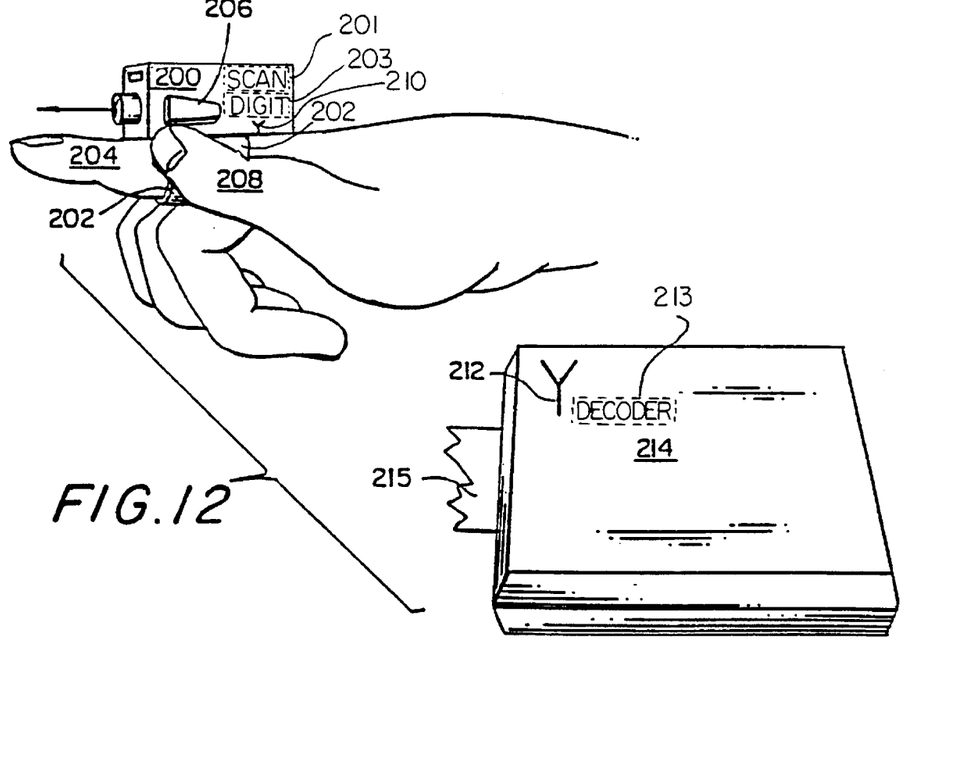
FIG. 12 illustrates an arrangement wherein a miniature scanner as disclosed herein for a bar code reader is mounted within a housing supported on an index ring mounting on the index finger of an operator, and the electronics in the bar code reader communicates by a short range radio transmitter with a receiver which might typically be mounted on the belt of the operator.

FIG. 12 illustrates an arrangement wherein a miniature scanner 201 as disclosed herein for a bar code reader is mounted within a housing 200 supported on an index ring mounting 202 on the index finger 204 of an operator. A trigger switch 206 is provided on the side of the housing 200 which is activated by the operator's thumb 208 to actuate the scanner 201. The electronics in the bar code reader communicates the data it has acquired by a short range radio transmitter 210 in the housing 200 to broadcast to an antenna 212 of a receiver in an associated control unit 214, which might typically be mounted on the belt 215 of the operator. The control unit 214 in the second housing typically would include a display, a keyboard, or a touch screen functioning as a display/keyboard, similar to that illustrated in FIG. 13. In an alternative embodiment, the scanner could be voice activated with a voice recognition means installed in either the housing 200 or the control unit 214.

A typical prior art bar code reader includes a bar code scanner, a signal digitizer, and a decoder. The bar code scanner generates a light beam directed toward a symbol to be read on a target and receives reflected light from the symbol to produce an analog electrical signal corresponding to the intensity of the reflected light. The signal digitizer includes a signal processor for processing the analog electrical signal to generate therefrom a digitized signal descriptive of the bar code symbol. The decoder decodes or translates the digitized signal into data represented by the symbol.

In the embodiment of FIG. 12, the finger mounted housing 200 includes therein the bar code scanner 203 for producing an analog electrical signal and a signal digitizer 203 for generating therefrom a digitized signal descriptive of the bar code symbol. The digitized signal is then transmitted by radio transmission to a decoder 213 located in the control unit 214.

Figure 13:
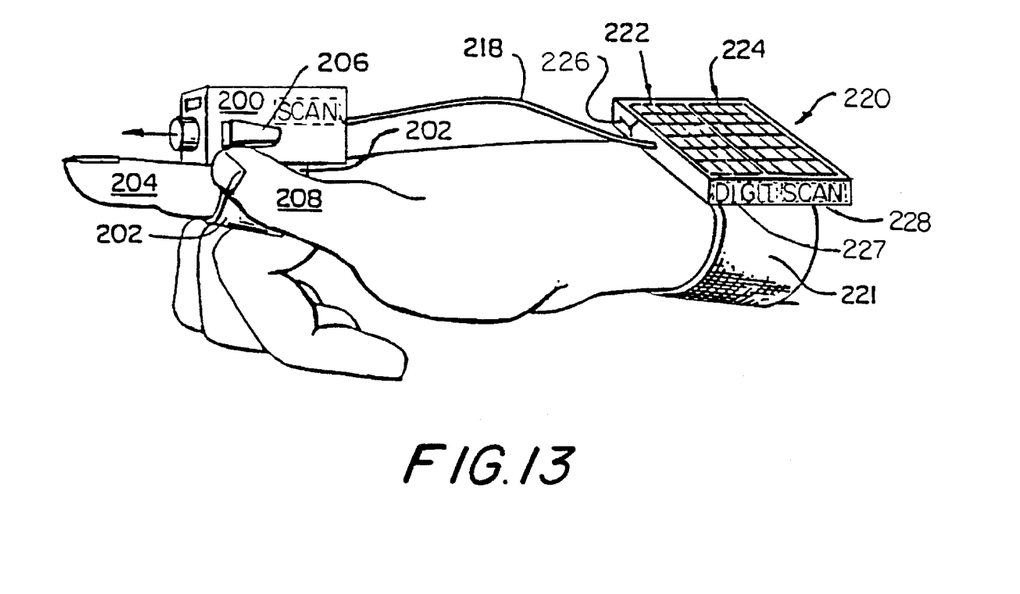
FIG. 13 illustrates an arrangement similar to FIG. 12 wherein a miniature scanner as disclosed herein for a bar code reader is mounted within a housing supported on an index ring mounting on the index finger of an operator, and the electronics in the bar code reader communicates by a wire with a portable terminal mounted on a wrist band on the wrist of the operator.

FIG. 13 illustrates an arrangement similar to FIG. 12 wherein a miniature scanner 201 as disclosed herein for a bar code reader is mounted within a housing 200 supported on an index ring mounting 202 on the index finger 204 of an operator. A trigger switch 206 is provided on the side of the housing 200 which is activated by the operator's thumb 208, or alternatively a voice activated arrangement could be utilized therein. The electronics in the bar code reader communicates the analog signal produced by the scanner 201 by a wire 218 with a portable control terminal 220 mounted on a wrist band 221 in a wristwatch like manner on the wrist of the operator. The portable terminal 220 typically includes an LED display 222, an array 224 of entry keys, and an antenna 226 for communicating with a central computer. The analog signal on wire 218 is directed to a signal digitizer 227 located in the control terminal 220 which digitizes the analog signal, and the output digitized signal therefrom is directed to a decoder 228 also located in the control terminal 220. The output of the decoder, which is data represented by the scanned bar code symbol, is then transmitted by 226 to the central computer. Accordingly, the embodiment of FIG. 13 also differs from the embodiment of FIG. 12 by placing the digitizer 227 in the associated control terminal 220 rather than in the housing 200.

Figure 14:
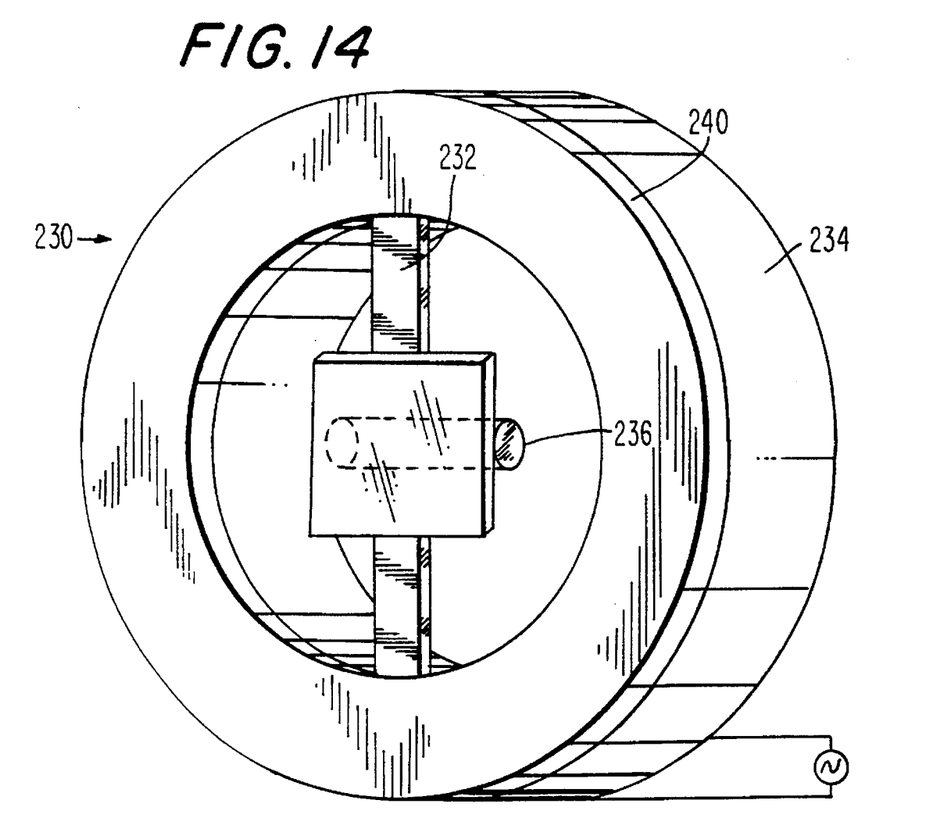
FIGS. 14 and 15 illustrate respectively a front perspective view and a side elevational view of a further embodiment of a torsional mode, miniature scanning element pursuant to the present invention.
Figure 15:
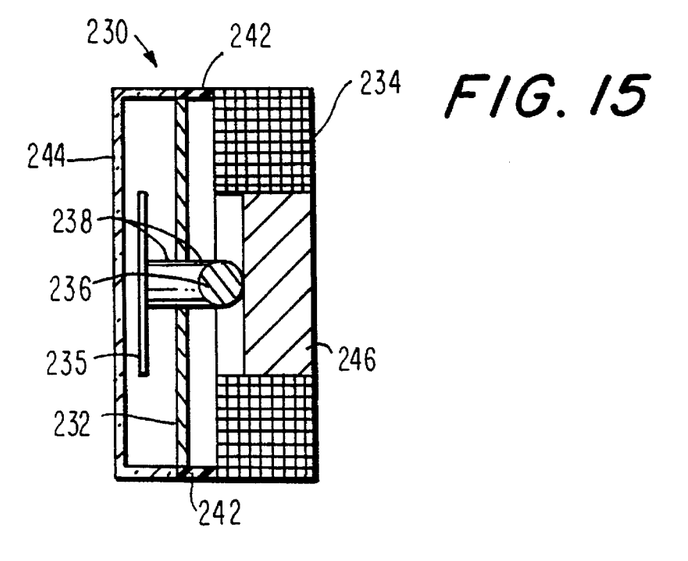

FIGS. 14 and 15 illustrate respectively a front perspective view and a side elevational view of a further embodiment 230 of a torsional mode, miniature scanning element pursuant to the present invention. The embodiment of FIGS. 14 and 15 advantageously can be operated from a very low frequency of about 1–2 Hz to a relatively high frequency of approximately 160–180 Hz without any physical changes or mechanical adjustments or tuning. The embodiment of FIGS. 14 and 15 is mechanically balanced, and the vertical mounting of a torsional flexural support member 232 therein advantageously does not result in any drooping of the torsional flexural support member and the components supported thereby. In this embodiment, a vertically mounted strip 232 of flexible material is attached and mounted at the top and bottom thereof to the front of a small magnetic coil 234. A permanent magnet 236 is mounted horizontally on one side of the flexible strip and a mirror 235 is mounted to the opposite side thereof. The permanent magnet and scanning mirror can be either attached directly to the flexible strip 232 or preferably by some type of holder 238. When an AC current is applied to the coil 234, interaction of the changing magnetic field of the coil 234 and the magnet 236 causes the flexible strip 232 to oscillate horizontally in a torsional mode.

The flexible strip 232 can be fixed to the coil by a holder 240 which might be mounted either directly to the front of the coil 234, as illustrated in FIG. 14, or with an intermediate shock absorber material 242, illustrated by a spring-like member in FIG. 15, in order to provide mechanical protection in the event of dropping of the scanning assembly 230. The holder 240 might have a transparent shield 244 mounted on the front thereof to provide a sandwich-type of structure for protection of the mirror. In order to enhance performance and save energy, the coil preferably has a core 246 of soft steel or similar material.

While several embodiments and variations of the present invention for a compact bar code scanning arrangement are described in detail herein, it should be apparent that the disclosure and teachings of the present invention will suggest many alternative designs to those skilled in the art.

What is claimed is:

1. An optical scanner module for directing a light beam in a pattern to scan a symbol, the scanner module comprising:
    a) an optical element for directing the light beam;
    b) a first magnet for establishing a first magnetic field;
    c) a second magnet for establishing a second magnetic field;
    d) an elongate flex element having fixedly-mounted opposed ends, for mounting said optical element and said first magnet at a location intermediate said opposed ends;
    e) one of said first and second magnets including an electromagnetic coil for receiving an AC drive current, said coil having a primary axis of symmetry that extends through said optical element whereby interaction of said first and second magnetic fields produces a flexing of said flex element causing scanning motion of said optical element.

2. An optical scanner module according to claim 1 wherein said first magnet is a permanent magnet, said first magnetic field being a fixed field and said second magnetic field being a variable field controlled by said AC drive current.

3. An optical scanner module according to claim 2 wherein said permanent magnet is an elongate magnet having a magnet axis, said magnet axis being disposed generally perpendicular to said elongate flex element.

4. An optical scanner module according to claim 2 wherein said elongate flex element is secured across said coil generally perpendicular to said primary axis.

5. An optical scanner module according to claim 4 wherein said coil has a front face and a rear face, said elongate flex element being secured across said front face of said coil.

6. An optical scanner module according to claim 5 wherein said permanent magnet is located within said coil, behind said front face thereof.

7. An optical scanner module according to claim 4 wherein said opposing ends of said flex element are secured directly to said coil.

8. An optical scanner module according to claim 4 including a shock absorber for protecting said flex element against jarring, said opposing ends of said flex element being secured to said shock absorber, and said shock absorber being secured to said coil.

9. An optical scanner module according to claim 4 including a transparent shield mounted in front of said optical element.

10. An optical scanner module according to claim 9 wherein said electromagnetic coil has a front face and a rear face, said transparent shield being mounted over said front face, thereby covering and providing protection for said optical element.

11. An optical scanner module according to claim 1 including a holder for mounting said optical element and said first magnet to said flex element.

12. An optical scanner module according to claim 4 including a magnetically-permeable core within said coil.

13. An optical scanner module according to claim 12 wherein said core is of soft steel.

14. An optical scanner module according to claim 1 wherein said optical element is a mirror.

15. An optical scanner module according to claim 1 wherein said flex element is positioned generally vertically in use.

16. A compact bar code scanner for reading bar code symbols comprising:
    a) a flexural member supported on a base for flexing motion;
    b) a light beam scanner mounted on said flexural member;
    c) a first electromagnetic drive element mounted on said flexural member;
    d) a second electromagnetic drive element, wherein a periodically changing drive signal introduced into one of said elements induces a periodically changing magnetic field which causes the flexural member, with one of said elements and the scanner mounted thereon, to oscillate at the frequency of the periodically changing drive signal, thereby causing a light beam from the light beam scanner to sweep in a direction across the bar code symbol, one of said elements being an electromagnetic coil having a primary axis of symmetry that extends through the light beam scanner; and
    e) a sensor for receiving light reflected from the bar code symbol being scanned and for producing an electrical signal corresponding to the intensity of the reflected light.

17. An optical scanner module for scanning indicia, comprising:
    a) an elongate flexural member fixedly supported at at least one end;
    b) a light beam scanner mounted on said flexural member;
    c) a first electromagnetic drive element mounted on said flexural member; and
    d) a second electromagnetic drive element, wherein a periodically changing drive signal introduced into one of said elements induces a periodically changing magnetic field which causes the flexural member, with one of said elements and the scanner mounted thereon, to oscillate at the frequency of the periodically changing drive signal, thereby causing a light beam from the light beam scanner to sweep across the indicia, one of said elements being an electromagnetic coil having a primary axis of symmetry that extends through the light beam scanner.

18. An optical scanner module according to claim 1 wherein said first magnet is a single elongate permanent magnet having opposite poles at opposite end regions and is mounted on said flex element for oscillating movement about a torsion axis that extends between said opposed ends of said flex element; and wherein said poles are located at opposite sides of said torsion axis; and wherein said coil has a passage extending along said primary axis; and wherein said poles alternately enter and exit said passage during said oscillating movement.

19. An optical scanner module according to claim 18 wherein said optical element is a mirror lying in a plane, and wherein said poles define a magnet axis that extends generally parallel to said plane during said oscillating movement.

20. An optical scanner module according to claim 19 wherein said magnet axis extends generally perpendicular to said primary axis of said coil in a rest position of said optical element.

* * * * *